United States Patent [19]

Fujii

[11] Patent Number: 4,580,222

[45] Date of Patent: Apr. 1, 1986

[54] CONTROL DEVICE FOR A BACK-UP MEMORY SET IN A VEHICLE CONTROL COMPUTER

[75] Inventor: Yoshimitsu Fujii, Nagoya, Japan

[73] Assignee: Nippondenso Co., Ltd., Kariya, Japan

[21] Appl. No.: 530,673

[22] Filed: Sep. 9, 1983

[30] Foreign Application Priority Data

Sep. 13, 1982 [JP] Japan .............................. 57-158040

[51] Int. Cl.$^4$ ..................... G06F 11/00; G11C 29/00; G11C 11/34
[52] U.S. Cl. ......................... 364/431.11; 364/431.12; 371/66
[58] Field of Search ....................... 364/431.04, 431.05, 364/431.11, 431.12; 371/4, 14, 66

[56] References Cited

U.S. PATENT DOCUMENTS

| | | | |
|---|---|---|---|
| 4,345,561 | 8/1982 | Kondo et al. | 364/431.04 |
| 4,372,274 | 2/1983 | Takase | 364/431.04 |
| 4,461,003 | 7/1984 | Tamaki | 371/66 |

FOREIGN PATENT DOCUMENTS

| | | | |
|---|---|---|---|
| 142399 | 6/1980 | German Democratic Rep. ... | 371/66 |
| 53-5935 | 1/1978 | Japan | 371/66 |
| 53-63936 | 6/1978 | Japan | 371/66 |
| 53-78139 | 7/1978 | Japan | 371/66 |
| 54-51334 | 4/1979 | Japan | 371/66 |
| 54-124641 | 9/1979 | Japan | 371/66 |

*Primary Examiner*—Felix D. Gruber
*Attorney, Agent, or Firm*—Cushman, Darby & Cushman

[57] ABSTRACT

A power voltage generator is supplied with the power voltage applied directly and via an ignition switch from a battery. The power voltage generator always supplies a power source to a computer equipped with a back-up memory and supplies to a comparator a power voltage signal from the power voltage generator when the ignition switch is turned on. The comparator compares a predetermined voltage signal with the power voltage signal from the power voltage generator. When the power voltage signal is higher than the reference voltage signal, the comparator issues a command to execute the program to a computer. The computer issues a write command to enable the back-up memory when it is judged that the increased voltage is stabilized, to thereby set up a write enable mode. If the power voltage signal drops when the ignition switch is turned off, this condition is detected using the output signal of the comparator. And it is judged whether or not the command to the back-up memory is being executed. If the command is being executed, the write enable state is continued until the command execution ends. The data write to the back-up memory is discontinued when the command execution ends.

13 Claims, 5 Drawing Figures

CONTROL DEVICE FOR A BACK-UP MEMORY SET IN A VEHICLE CONTROL COMPUTER

BACKGROUND OF THE INVENTION

The present invention relates to a control device for a back-up memory set in a vehicle control computer which is used for fuel injection control, ignition control and other electronic controls of a vehicle engine.

It has been well known that vehicle engines can be electronically controlled depending on the running condition of the vehicles.

Such an electronic control unit for vehicle engines is composed of a computer which contains a back-up memory for temporarily storing various types of measuring data and processed data.

The vehicle control computer is set in operation when the ignition switch is turned on. Therefore, the data write control for the back-up memory is executed depending on whether the ignition switch is on or off. More specifically, when the ignition switch is turned on, an increase of power source voltage is sensed by the computer hardware and the computer enables the write operation or write enable state to the back-up memory when the power voltage increases above a specific or predetermined voltage.

When the ignition switch is turned off, the hardware senses a decrease in the power voltage and the computer inhibits or disables the write operation to the back-up memory when the power voltage decreases below the specific voltage.

With such an arrangement, when the power voltage drops below the specific voltage during the course of writing data into the back-up memory, the data writing operation into the back-up memory is inhibited. For this reason, there is a danger that the contents of the back-up memory may be destroyed. Thus, care needs to be taken to protect memory contents.

SUMMARY OF THE INVENTION

It is an object of the present invention to provide a control device for a back-up memory set in a vehicle control computer which ensures protection of the contents of the back-up memory when the power voltage varies particularly during the ON and OFF periods of an ignition switch.

It is another object of the present invention to control the command for the write disable to the back-up memory by checking the data write condition to the back-up memory when the power voltage drops excessively.

It is still another object of the present invention to provide an automatic selection between a write enable mode and a write disable mode for the back-up memory depending on a power voltage, and to continue the write enable mode until the write operation ends, particularly when the voltage drops excessively during the write operation.

A control device for a back-up memory set in a vehicle control computer according to the present invention starts program execution when the ignition switch is turned on and the power voltage increases above a specific voltage. Further, the control device enables a data write operation to the back-up memory after the power voltage increases and settles down to a stationary state, allowing for instability of the power voltage that inevitably occurs as the start switch is turned on to start the engine. With such an arrangement, the back-up memory can be protected from an abnormality in the processing operation of the computer and its input circuit, caused by an unstable or insufficient power voltage level.

When the ignition switch is turned off and the power voltage drops below a specific level, the control device initiates a write enable command to execute a data write operation to the back-up memory, continues a write enable mode during the execution of the instruction, and gives the back-up memory a write disable command to the back-up memory upon the completion of the execution. Therefore, processed data and the like are correctly and completely loaded into the back-up memory at all times.

If the write operation to the back-up memory is controlled in this way, protection of the contents of the back-up memory is ensured against a variation in the power voltage when the ignition switch is operated. The problems that occur when the contents of the back-up memory are distorted or destroyed due to an abnormality in the operation of the computer and its input circuit are eliminated.

DETAILED DESCRIPTION OF THE PREFERRED EMBODIMENTS

Figure 1:
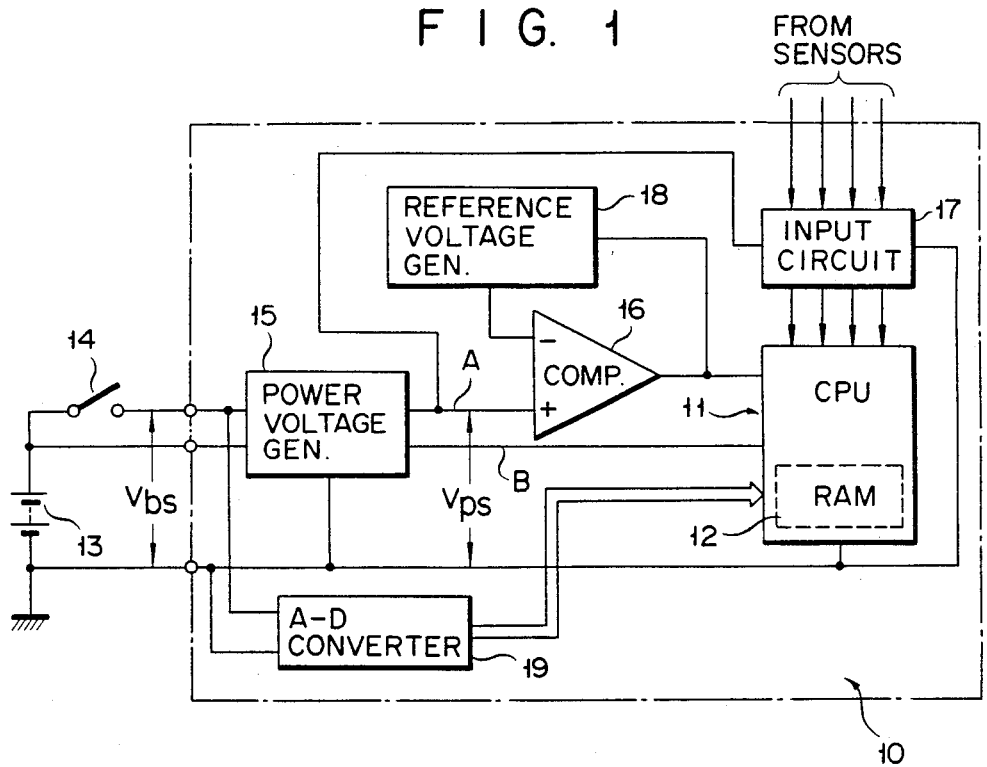
FIG. 1 shows a functional diagram illustrating a control device for a back-up memory set in a vehicle control computer which is an embodiment of the present invention.

FIG. 1 shows a configuration of a computer 10 used for controlling a vehicle engine and its peripheral portions. A CPU (central processing unit) 11 for executing operations is constructed with a one-chip semiconductor device containing a RAM (random access memory) 12 which serves as a back-up memory.

One power source for the computer 10 may be a battery 13 for generating a voltage of 12 V, which is carried on a vehicle. The battery 13 is connected to a power voltage generator 15 in the computer 10 via an ignition switch 14. The power voltage generator 15 produces an output voltage Vps (e.g. 5 V) on a line A when the power voltage Vbs increases as the ignition switch 14 is turned on. The battery 13 also supplies a direct power source through the power voltage generator 15, so that a voltage output corresponding to the battery voltage is always produced from a line B. The line B supplies a power source to the RAM 12 and the CPU 11 as well.

The line A from the power voltage generator 15 is connected to a comparator 16 and supplies a power source to an input circuit 17 of the CPU 11. With a rise in voltage Vps, the line A sets the input circuit 17 in a normal operation state. The input circuit 17 is supplied with an operating state sensing signal, an engine intake air amount sensing signal, a rotating number sensing signal, a cooling water temperature sensing signal, an air-fuel ratio sensing signal and other sensing signals produced from various types of sensors for operating a fuel injection amount by observing the running state of the engine. A voltage signal derived from a reference voltage generator 18 is supplied to the comparator 16, where it is compared with a voltage on the output line A from the power voltage generator 15. The reference voltage generator 18 generates two types of voltages Va and Vb (where Va≧Vb) depending on the logical state of the comparator 16. Either of those voltage signals is applied as a comparing voltage to the comparator 16. More specifically, when the voltage on the line A is low and the logical output of the comparator 16 is "0", the voltage signal Va from the reference voltage generator 18 is applied to the comparator 16. And when the voltage on the line A increases to a sufficient level and the logic output of the comparator 16 is "1", the reference voltage generator 18 produces a voltage signal Vb. The logic output signal from the comparator 16 gives a program execution command to the CPU 11 at one of its many input terminals, and when the voltage on the line A is increased sufficiently, the CPU 11 is set in a program executing mode.

The voltage Vbs taken out through the ignition switch 14 is converted into a digital signal by an analog to digital (A/D) converter 19 and supplied to the CPU 11. In the CPU 11, the digital voltage signal converted is consecutively sampled several times to check that the power voltage Vbs reaches a stable state. After the power source voltage stabilization is checked, the program is executed.

Figure 2:
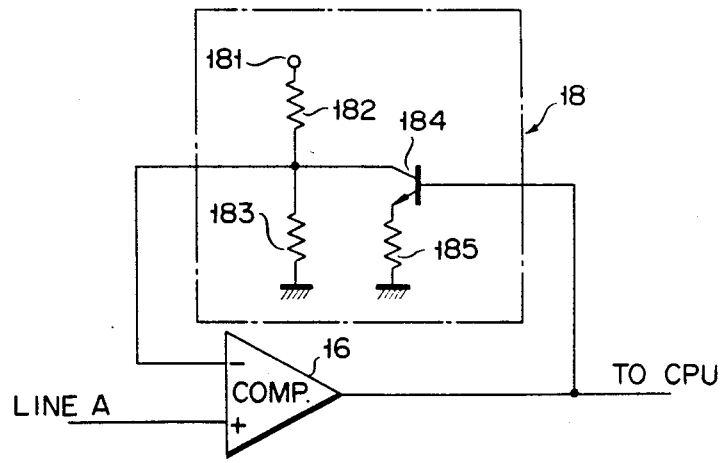
FIG. 2 is a practical arrangement of a reference voltage generator used in the control device shown in FIG. 1.

FIG. 2 shows a practical arrangement of the reference voltage generator 18 for applying a comparing voltage signal to the comparator 16. A series circuit of resistors 182 and 183 is connected between a terminal 181 provided with a reference voltage through the line B, and a ground. A voltage derived from a connection point between the resistors 182 and 183 is supplied as a comparing voltage to the comparator 16. A series circuit of a transistor 184 as a switching element and a resistor 185, are connected in parallel with the resistor 183. The output signal from the comparator 16 is applied as a gate signal to the base of the transistor 184. Changes in the output level of comparator 16 must be sufficiently large to cause transistor 184 to change between conductive and non-conductive states.

When the logical output from the comparator 16 is "0", the transistor 184 is in an OFF state and the reference voltage generator 18 produces a higher voltage Va. When the logic output from the comparator 16 is "1", the resistor 185 is connected in parallel with the resistor 183, so that the reference voltage generator 18 produces a lower voltage Vb. For example if Va=4.7 V then Vb=4.5 V.

Figure 3:
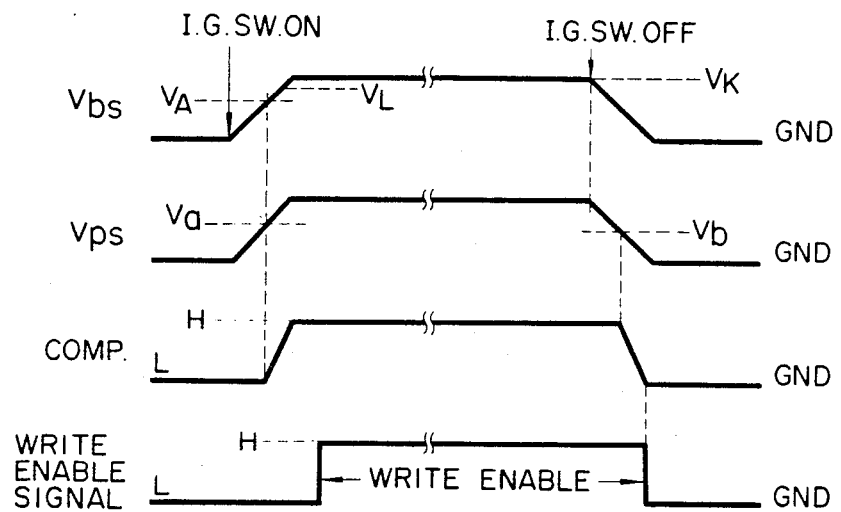
FIG. 3 shows a timing diagram useful in explaining the operation of the control device shown in FIG. 1.

When the ignition switch 14 (I.G.SW) shown in FIG. 1 is turned on, the vehicle battery 13 is connected to the computer 10 and the voltage Vbs supplied to the power voltage generator 15 rises as shown in FIG. 3. With the voltage rise Vbs, the output voltage Vps of the power voltage generator 15 starts to rise as shown in FIG. 3, so that the voltage is supplied through the line A to the comparator 16 and the analog to digital converter 19. In this case, the voltage on the line B produces a voltage necessary for driving the CPU 11, for example, 5 V, irrespective of the operation of the ignition switch 14, and supplies a power source to the RAM 12 for protecting the stored data.

In such an initial state, the output signal from the comparator 16 is L (low) in level and the output signal from the reference voltage generator 18 is Va which in turn is applied to the comparator 16 where the voltage Va is compared with the input voltage Vps from the power voltage generator 15. When the voltage Vps rises and exceeds the comparing voltage Va, the output signal COMP from the comparator 16 rises from the L to the H (high) level, as shown in FIG. 3. When this output signal from the comparator 16 rises to the H level, that is to say, when it is detected that the power voltage Vps exceeds the specific voltage Va, the CPU 11 is ready for program execution through the software processing.

Figure 4:
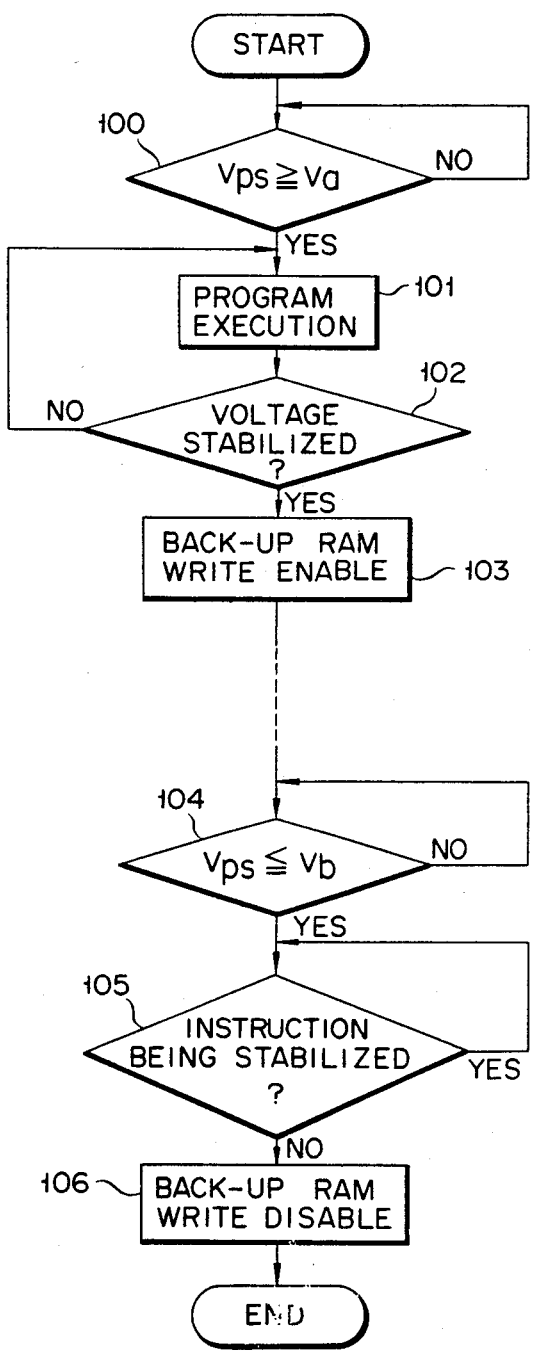
FIG. 4 shows a flow chart illustrating the operation of the embodiment shown in FIG. 1.

FIG. 4 illustrates such an operation. Beginning with the initial ON operation of the ignition switch 14, a step 100 is executed in which CPU 11 monitors an input from comparator 16 related to whether or not the power voltage Vps is greater than or equal to the reference voltage Va, and the operation continues to step 101 when the voltage Vps rises above the voltage Va. In step 101, a command to execute the program is issued for the CPU 11 and then step 102 is executed.

Step 102 reads the digital data on the power voltage Vps from the A/D converter 19 at a plurality of time intervals, to check whether the voltage Vps is stabilized or not. An increase in the power voltage is monitored also by the A/D converter 19 and is correspondingly converted into a digital signal and the converted signal is supplied to the CPU 11. The CPU 11 consecutively samples the voltage data every 4 msec, for example, and checks voltage stabilization after two to three samples. In step 102, after the stabilization of the voltage is ascertained, the operation continues to step 103. On the other hand, if the power voltage is not yet stabilized, the operation returns to step 101.

The digital value for checking the power voltage stabilization, comes from digital data relating to the voltage value VL which satisfies the relationship "VA<VL<VK" where VA is a battery voltage Vbs when the voltage Vps shown in FIG. 3 increases to the comparing voltage Va and VK is the battery voltage Vbs in a stationary state. If VA is 5 V and VK is 12 V, VL is approximately 8 V.

In step 103, the software allows data to be loaded into the RAM 12 in the CPU 11. Specifically, the data write to the back-up RAM 12 is enabled when the power voltage Vps is stabilized after the ignition switch 14 is turned on. Therefore, the problem that occurs when the contents of the RAM 12 are not ensured due to the instability of the power voltage is solved.

Let us consider a case where the ignition switch 14 is turned off during the operation of the computer 10 which starts when the ignition switch 14 is turned on. As shown in FIG. 3, when the switch 14 is turned off, the supplied voltage Vbs from the battery drops and the output voltage Vps from the power voltage generator 15 also drops. When the power voltage Vps goes below the reference voltage Vb, the output signal COMP from the comparator 16 changes from H to L in level. As the result of the output comparison, the output voltage from the reference voltage generator 18 changes Vb to Va.

In step 104 of FIG. 4, the CPU 11 detects that the output signal from the comparator 16 changes to L in level and ascertains that the power voltage Vps goes below the reference voltage Vb. Step 105 determines whether or not the execution of the command is currently being executed. In step 105, the CPU 11 completes the command execution. And when it ascertains that a command is not currently being executed, the operation advances to the next step 106, to prohibit the loading of data into the RAM 12. On the other hand, if in step 105 it is determined that a command is now being executed, the operation flows to step 106 in synchronism with the clock in the CPU 11 after the command execution ends. At this time, the CPU 11 gives a write disable command to the RAM 12.

Thus, even when the power voltage drops, if the CPU 11 is executing a command, the write enable mode is continued until the command execution ends. Therefore, during the course of the write into the back-up RAM 12, the data write is not interrupted which interrupted might destroy the contents of the back-up RAM 12.

In the above-mentioned embodiment, when the ignition switch 14 is turned on, after the power voltage is above the preset reference voltage, the digital data from the A/D converter 19 is analyzed to determine if the power voltage is stabilized. After the power voltage has stabilized, the data write to the back-up RAM 12 is enabled.

Alternately, by measuring the time period when the power voltage Vps is above the reference voltage Va following the period when the ignition switch 14 is turned on, it is determined whether the power voltage Vps is satisfactorily stabilized. On the basis of this, the data write to the RAM 12 is enabled.

Figure 5:
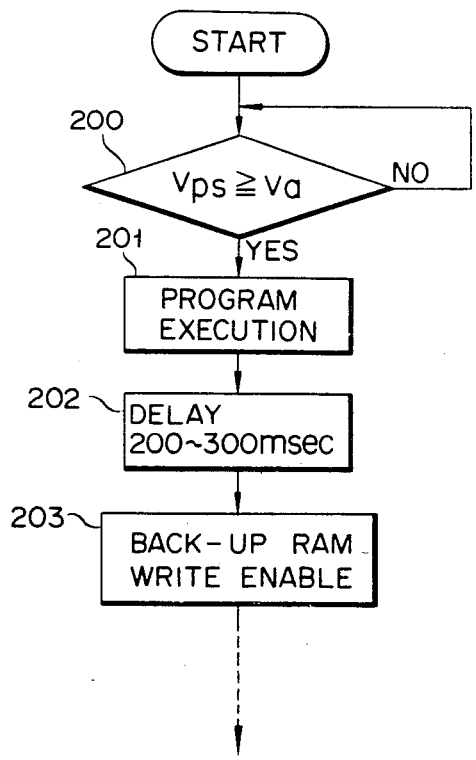
FIG. 5 shows a flow chart illustrating the operation of another embodiment according to the present invention.

Specifically, as shown in FIG. 5, in step 200 CPU 11 monitors an input from comparator 16 related to whether the voltage Vps exceeds the reference voltage Va, and in step 201, once the comparison is positive, CPU 11 initializes program execution. From this point, the time elapse is counted by a counter in the CPU 11. In step 202, a time delay of 200 to 300 msec is set up. In a step 203, the data write to the back-up RAM 12 is permitted. With such an arrangement, the control device in this embodiment permits omission of the analog to digital converter 19 which is used in the embodiment of FIG. 1.

What is claimed is:

1. A vehicle control computer system having a back-up memory comprising:
    voltage detecting means for detecting when a voltage related to a power source voltage exceeds a first predetermined level and when said related voltage drops under a second predetermined level; and
    processing means, having a back-up memory and responsive to said voltage detection means, said processing means for: (1) executing a vehicle control program, when said voltage detection means detects that said related voltage excees said first predetermined level, (2) determining when said power source voltage is stabilized with said related voltage above said first predetermined level, (3) supplying a data write allowance instruction signal to said back-up memory only when the stabilization of said power source voltage is determined, (4) determining whether or not said processing means is giving instructions to said back-up memory when said voltage detection means detects that said related voltage drops below said second predetermined level, and (5) inhibiting data writing into said back-up memory only when said voltage detection means detects that said related voltage drops below said second predetermined level and said processing means is not giving instructions to said back-up memory.

2. A system according to claim 1, further comprising a power voltage generating section including a direct power means for providing electric power from said power source voltage without passing through any switch to said processing means, and a switched power means for providing electric power from said power source voltage through an ignition switch to said voltage detection means.

3. A system according to claim 2, wherein said voltage detection means comprises:
    a reference voltage generating section for generating a reference voltage related to said first and second predetermined levels; and
    means for comparing said electric power from said switched power means with said reference voltage and generating an output signal when the voltage from said switched power means is higher than said reference voltage.

4. A system according to claim 3, wherein said reference voltage generating section sets said reference voltage at a first level when said switched power means provides a voltage below said reference voltage and sets said reference voltage at a second level when said switched power means provides a voltage above said reference voltage.

5. A system according to claim 4, wherein said first level is slightly higher than said second level voltage.

6. A system according to claim 4, wherein said reference voltage setting section includes a voltage setting circuit for generating said first level and said second level slightly lower than said first level, and means for selecting said second level when said comparing means determines a voltage from said switched power means rises above said first level, and for selecting said first level when said comparing means determines a voltage from said switched power means drops below said second level.

7. A system according to claim 1, wherein said processing means includes an analog to digital converting means for converting said power source voltage into a digital signal for performing said stabilization determining function, whereby after said voltage detecting means detects the rise of said related voltage above said predetermined level and said processing means has performed said program execution function, said stabilization determining function of said processing means determines whether said digital signal is stabilized at a specific value representing the increased, stabilized state of said power source voltage.

8. A system according to claim 1, wherein said stabilization determining function of said processing means sets a period of delay time after said program executing function before said data write allowance instruction signal supplying function is performed.

9. A control system for a vehicle equipped with a storage battery and an agnition switch comprising:
    a voltage generator adapted for connection to said storage battery through said ignition switch for generating a voltage signal during closing of said ignition switch;
    a voltage comparator connected to said voltage generator for comparing said voltage signal with a reference voltage and producing a comparator output when said voltage signal is in excess of said reference voltage; and a control computer connected to said voltage comparator and adapted to be kept supplied with power from said storage battery irrespective of opening and closing of said ignition switch, said control computer including a back-up memory for data storage and a central processing unit for program execution, said central processing unit being programmed to monitor said comparator output and to enable writing data in said back-up memory when the power supply condiiton from said storage battery is determined to be stabilized.

10. A control system according to claim 9 further comprising an analog-digital converter for converting a voltage of said storage battery into a digital value, and wherein said central processing unit is programmed to detect said power supply condition by repeatedly monitoring the digital value from said analog-digital converter.

11. A control system according to claim 9, wherein said central processing unit is programmed to detect the power supply condition by detecting the occurrence of a period of time from said comparator output so that said back-up is enabled to write in data when the measured time lapse reaches a predetermined interval.

12. A control system according to claim 9, wherein said central processing unit is programmed to disable writing data in said backup memory whem said comparator output disappears and writing data in said backup memory is completed.

13. A control system according to claim 9, further comprising an analog-digital converter for converting a voltage of said storage battery into a digital value, wherein said central processing unit is programmed to detect said power supply condition by repeatedly monitoring the digital value from said analog-digital converter, and said central processing unit is programmed to disable writing data in said back-up memory when said comparator output disappears and writing data in said back-up memory is completed.

* * * * *